(12) United States Patent
Slamka et al.

(10) Patent No.: US 7,808,962 B2
(45) Date of Patent: *Oct. 5, 2010

(54) COMMUNICATION OF AUDIO CONTROL SIGNALS FOR WIRELESS AUDIO HEADPHONES

(75) Inventors: Milan Slamka, Camas, WA (US); Todd Yuzuriha, Vancouver, WA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 176 days.

This patent is subject to a terminal disclaimer.

(21) Appl. No.: 12/102,812

(22) Filed: Apr. 14, 2008

(65) Prior Publication Data

US 2008/0192950 A1 Aug. 14, 2008

Related U.S. Application Data

(63) Continuation of application No. 11/223,767, filed on Sep. 9, 2005, now Pat. No. 7,382,760.

(60) Provisional application No. 60/608,659, filed on Sep. 10, 2004.

(51) Int. Cl.
*H04W 4/00* (2009.01)
(52) U.S. Cl. .................. 370/338; 370/310; 370/328; 455/569.1; 455/41.2; 381/311
(58) Field of Classification Search ............ 455/4.1, 455/550, 552.1, 569.1–557, 556.2, 353; 370/310, 370/328, 338; 710/62–72; 381/17, 74, 311–312, 381/300–301, 331
See application file for complete search history.

(56) References Cited

U.S. PATENT DOCUMENTS

| D542,789 | S | 5/2007 | Depay | |
|---|---|---|---|---|
| 7,245,502 | B2 | 7/2007 | Kochis et al. | |
| 7,269,400 | B2 | 9/2007 | Lazzarotto et al. | |
| 7,382,760 | B2 | 6/2008 | Slamka et al. | |
| 2002/0159419 | A1* | 10/2002 | Morris | 370/338 |
| 2003/0013411 | A1* | 1/2003 | Uchiyama | 455/40 |
| 2004/0147282 | A1* | 7/2004 | Nakasato et al. | 455/552.1 |
| 2004/0174249 | A1* | 9/2004 | Kusubashi | 340/7.4 |
| 2004/0204168 | A1 | 10/2004 | Laurila | |
| 2005/0027385 | A1 | 2/2005 | Yueh | |
| 2005/0050249 | A1* | 3/2005 | Ide | 710/72 |
| 2005/0157748 | A1* | 7/2005 | Park | 370/466 |
| 2005/0159829 | A1* | 7/2005 | Yeh | 700/94 |
| 2005/0181826 | A1 | 8/2005 | Yueh | |
| 2006/0025074 | A1 | 2/2006 | Liang et al. | |
| 2006/0059289 | A1* | 3/2006 | Ng et al. | 710/305 |
| 2006/0217065 | A1* | 9/2006 | Spilo et al. | 455/41.2 |

* cited by examiner

*Primary Examiner*—Kamran Afshar
(74) *Attorney, Agent, or Firm*—Townsend and Townsend and Crew LLP

(57) ABSTRACT

A wireless audio headphone communication system has an audio input for receiving an audio signal from an audio source. A wireless transceiver receives and transmits radio frequency communications with a wireless audio headphone, the communications including an audio control signal that conforms to a wireless audio control protocol of a wireless communication protocol. A converter converts the audio control signal between the wireless audio control protocol transceived by the wireless transceiver and a local control protocol for controlling the audio source.

16 Claims, 2 Drawing Sheets

COMMUNICATION OF AUDIO CONTROL SIGNALS FOR WIRELESS AUDIO HEADPHONES

CROSS-REFERENCES TO RELATED APPLICATIONS

This application is a continuation of and claims priority from U.S. patent application Ser. No. 11/223,767, filed Sep. 9, 2005, which claims the benefit of the filing date of U.S. Provisional Patent Application No. 60/608,659, filed Sep. 10, 2004, both of which are incorporated by reference.

BACKGROUND OF THE INVENTION

The present invention relates to communicating audio control signals for wireless headphones and, in particular, to a wireless audio headphone communication system for communicating such signals.

BRIEF SUMMARY OF THE INVENTION

Stereo headphones and other audio output devices that conform to the Audio Profile of the Bluetooth® radio frequency (RF) wireless standard can utilize or control sources of audio content from a variety of Bluetooth® enabled audio platforms, such as IPAQ™ portable players, iPOD™, portable players, MP3 portable players, media player software on personal computers, home stereo systems, etc. In particular, the Bluetooth® specification includes an "Audio Video Remote Control Protocol" (AVRCP) that provides for control of a content source (e.g., portable player or media player software on a personal computer) from a content sink (e.g., a Bluetooth® headphone) over a wireless radio frequency (RF) link. The Audio Video Remote Control Protocol (AVRCP) also provides for control of the content sink from the content source over the wireless RF link. The control features may include remote control of functions such as Play, Pause, Volume UP, Volume Down, Forward and Previous track.

Typically, headphone architecture must include particular elements such as input/output (I/O) components, switches, firmware, etc. to implement remote control features according to the AVRCP. Content sources that are embedded in products like portable players (e.g., IPAQ™, iPOD™, and MP3 portable players) require embedded drivers that are specific for these products. For example, model-dependant Widomm™ drivers are used in IPAQ™ portable players and some personal computers with embedded Bluetooth® stacks. Products such as personal computers (e.g., laptop computers or desktop computers) that do not have embedded Bluetooth® modules require a Bluetooth® digital dongle, or other RF module, and appropriate driver software, which is available from a variety of sources such as Widcomm, IVT, etc.

Large numbers of existing personal computers do not have embedded Bluetooth® RF modules or the corresponding driver software. Even with Bluetooth® digital dongles or other RF modules connected to them, such personal computers would further require model-dependent drivers for Audio Profile Bluetooth® devices, like stereo headphones, to provide control of a content source (e.g., media player software) over the wireless RF link. Promulgation of such a wide variety of drivers can be expensive for the provider, and accessing and installing the correct drivers can be difficult for users.

Accordingly, the present invention provides a wireless audio headphone communication system having an audio input for receiving an audio signal from an audio source, a wireless transceiver for receiving and transmitting radio frequency communications with a wireless audio headphone, the communications including an audio control signal that conforms to a wireless audio control protocol of a wireless communication protocol, and a converter for converting the audio control signal between the wireless audio control protocol transceived by the wireless transceiver and a local control protocol for controlling the audio source.

In one implementation, the present invention provides a universal USB dongle (e.g., a USB "stick") that requires no source-specific software drivers and that will operate on any computing device with a USB source connection, such as a personal computer (i.e., laptop or desktop). In one implementation, the universal USB dongle conforms to the Audio Profile of the Bluetooth® wireless standard as an Audio Profile device, enumerating as an audio device to the source (e.g., personal computer) and providing full control from or to the source or the sink (e.g., a wireless stereo headphone). The source may have a variety of players (e.g., software players) to deliver music or other content to the headphone. As a USB device the universal dongle operates in a plug and play manner, independent of the platform and software.

Additional objects and advantages of the present invention will be apparent from the detailed description of the preferred embodiment thereof, which proceeds with reference to the accompanying drawings.

DETAILED DESCRIPTION OF THE INVENTION

Figure 1:
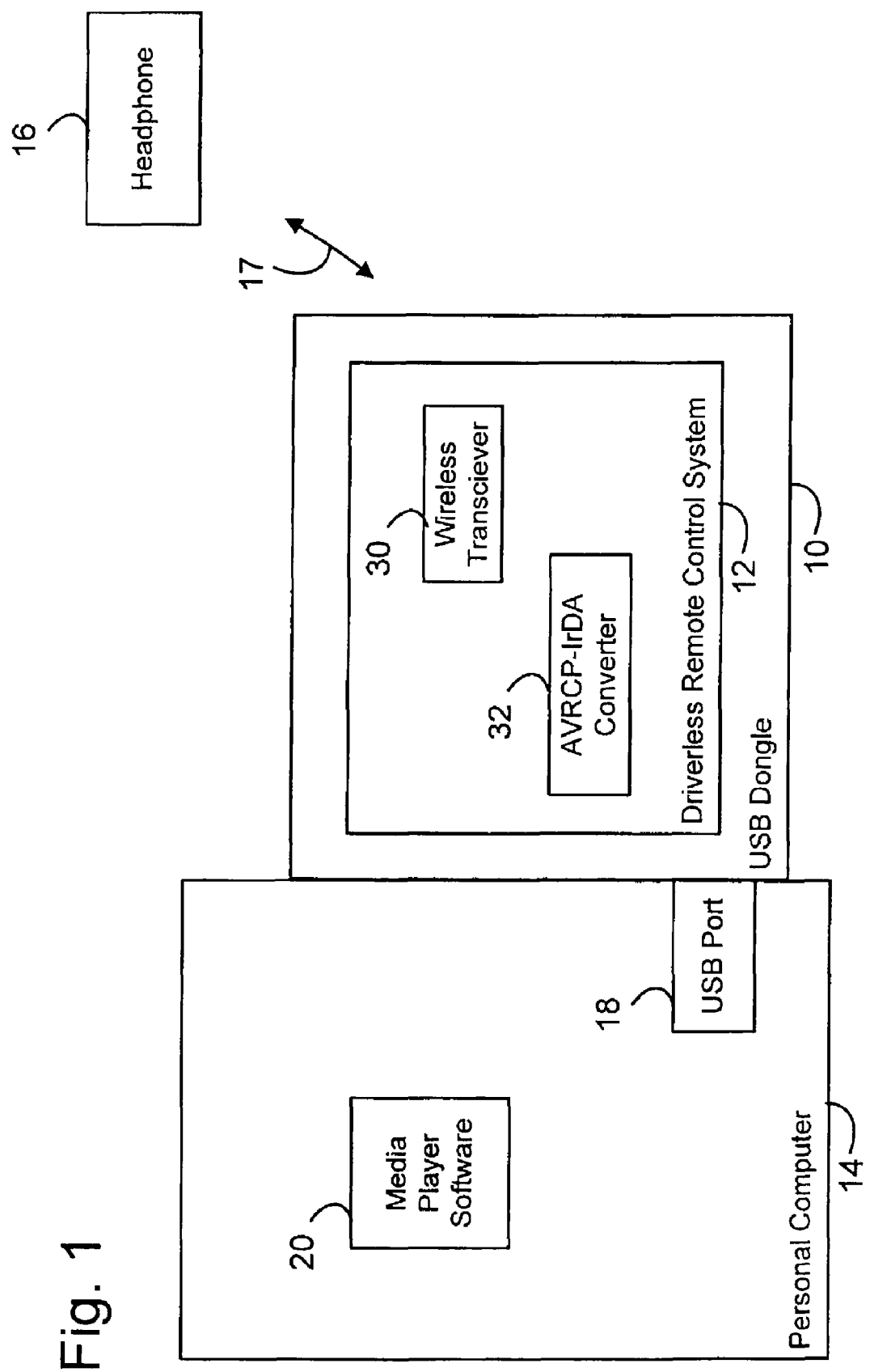
FIG. 1 is a block diagram of a USB dongle with a driverless audio device RF remote control system.

FIG. 1 is a block diagram of a universal serial bus (USB) dongle or "stick" 10 with a driverless audio device RF remote control system 12. Driverless audio device RF remote control system 12 provides remote control between, for example, a personal computer 14 and a headphone 16 that communicate over a radio frequency (RF) link 17 that is based on a wireless standard like Bluetooth®. Driverless audio device RF remote control system 12 operates without installation of a remote control software driver onto personal computer 14.

Personal computer 14 includes a USB port 18 into which USB dongle 10 is plugged. Media player software 20 on personal computer 14 provides audio content that is transmitted to and played on headphone 16 according to remote control signals transmitted between computer 14 and headphone 16. It will be appreciated that reference to the Bluetooth® wireless standard is merely as an example and that RF link 17 could operate according to any wireless standard.

Remote control system 12 includes a wireless (e.g., Bluetooth®) transceiver system or module 30 for transmitting audio content from computer 14 to headphone 16 and for transmitting remote control commands between headphone 16 and computer 14. For example, the remote control commands may include functions such as Play, Pause, Volume Up, Volume Down, Forward and Previous Track that are selected by user manipulation of controls on headphone 16 and are implemented by media player software 20, or vice versa. In one implementation, the remote control commands are transmitted and received in accordance with the "Audio Video Remote Control Protocol" (AVRCP) of the Bluetooth® standard.

An AVRCP-IrDA converter 32 provides conversion or translation between AVRCP remote control commands and corresponding computer system commands based upon a widely-supported computer protocol or standard such as the Infrared Data Association (IrDA) standard that is widely available in personal computers with short-range infrared transceivers. The AVRCP remote control commands correspond to a wireless audio control protocol (e.g., for transmitting control signals to and from headphone 16). The IrDA control signals correspond to device control protocols that can control computer audio sources (e.g., media software) and are widely available on personal computers without requiring separate installation of specific drivers. Accordingly, the VRCP-IrDA converter 32 may generally be referred to as a converter between wireless audio control protocols and local computer device control protocols.

In an implementation directed to a personal computer employing the Windows® operating system, for example, the Winsock API allows IrDA control signals to access and control Human Interface Device (HID) commands. HID commands are typically used to command devices that are used by humans to control the operation of computer systems, such as keyboards and pointing devices (e.g., standard mouse devices, trackballs, and joysticks), front-panel controls (e.g., GUI knobs, switches, buttons, sliders), etc. This allows widely available short-range infrared transceivers that adhere to the Infrared Data Association (IrDA) standard (e.g., non-Windows® devices) to communicate with and control Windows®-based applications. The IrDA protocols are open and are designed to support non-PC devices.

In operation the Winsock API exposes the IrDA TinyTP protocol to the applications writer. A non-Windows® device that implements the TinyTP protocol will be able to exchange data with Windows®-based applications such as Jukebox Windows Media Player or another existing software play source. IrDA is uniquely suited for public access applications because the connector can be completely sealed and because the IrDA connectivity model does not require that connected devices be treated as PC-peripherals. This means that there is no persistent relationship between IrDA devices, nor are there any device drivers to install to enable connectivity.

It will be appreciated, therefore, that the present invention includes translation of AVRCP commands at the dongle 10 to appropriate IR commands for a forward control path (i.e., sink-to-source), as well as translation of IR commands to AVRCP commands for a reverse control path (i.e., source-to-sink). For example, converter 32 converts AVRCP-format remote control commands such as Play, Pause, Volume Up, Volume Down, Forward and Previous Track that are selected by user manipulation of controls on headphone 16 into corresponding IrDA control signals that are delivered to computer 14 via wireless link 17, wireless transceiver 30, and USB port 18. The converted corresponding IrDA control signals access and control Human Interface Device (HID) commands that control a media source such as media player software 20. Likewise, converter 32 can convert IrDA-format remote control commands into corresponding AVRCP control signals that are delivered from computer 14 to headphone 16 via USB port 18, wireless transceiver 30, and wireless link 17.

Figure 2:
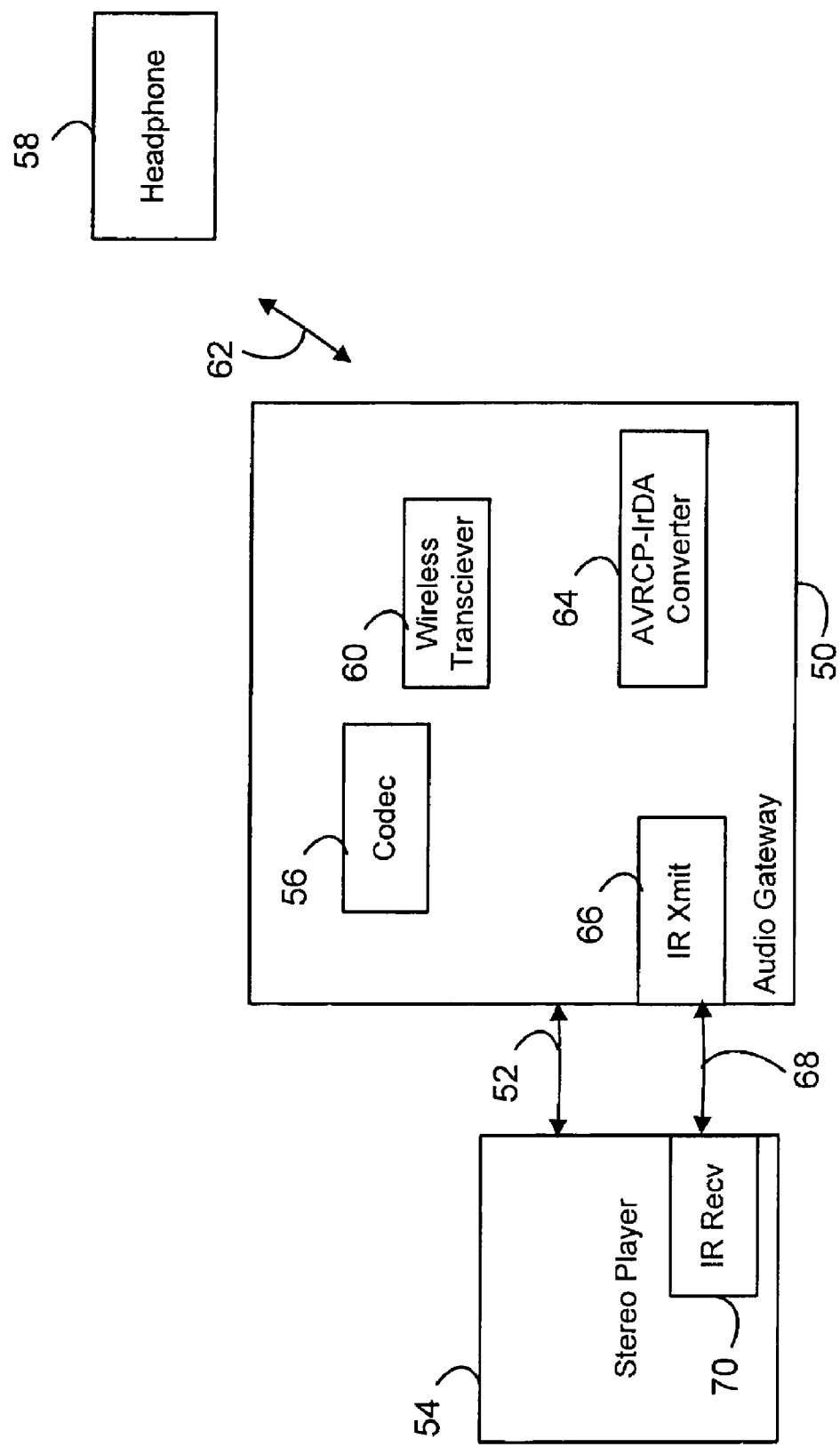
FIG. 2 is a block diagram of an audio gateway as an alternative embodiment of the present invention.

FIG. 2 is a block diagram of an audio gateway 50, sometimes referred to as an IR-RF converter unit, as an alternative embodiment of the present invention. Audio gateway 50 is connected to receive an analog audio signal over a wired link 52 from an analog audio source, such as a stereo player 54. Wired link could employ conventional audio-style RCA-type connectors, for example. Audio gateway 50 includes a codec 56 that receives the analog audio signal and generates a corresponding digital one. The digital audio signal is provided to a wireless RF (e.g., "Bluetooth® transceiver 60 for RF transmission over an RF link 62 to a headphone 58 to be heard by a user.

Remote control commands may be transmitted between headphone 58 and stereo player 54 (e.g., from headphone 58 to stereo 54). For example, the remote control commands may include functions such as Play, Pause, Volume Up, Volume Down, Forward and Previous Track that are selected by user manipulation of controls on headphone 58 and implemented by stereo player 54. The remote control commands are transmitted and received at audio gateway 50 in accordance with the "Audio Video Remote Control Protocol" (AVRCP) of the Bluetooth® standard.

An AVRCP-IrDA converter 64 provides conversion or translation between the AVRCP remote control commands transmitted by headphone 58 over RF link 62 and corresponding stereo control commands based upon a widely-supported protocol or standard such as IrDA. IrDA is the Infrared Data Association (IrDA) standard that is widely used in remote control of audio-visual equipment. Wireless RF transceiver 60 delivers the control signals to AVRCP-IrDA converter 64, which converts them to the IrDA format for transmission by an IR transmitter 66 over an IR link 68. An IR receiver 70 of stereo payer 54 receives the IrDA control signals and responds accordingly.

It will be appreciated that audio gateway 50 could be connected to analog audio sources other than a stereo. For example, audio gateway could receive an analog audio signal from the audio output of a personal computer (e.g., laptop or desktop). Such a configuration could be used if the personal computer does not include a USB port or if the existing USB ports are not available due to other uses. In this instance, audio gateway 50 would receive the analog audio signal in the manner described above and control signals could be return over IR link 68 to an IrDA transceiver on the computer.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A USB dongle having a USB connector for communicating with a computing device through a USB port, comprising:
   a wireless transceiver for transceiving wireless communications with a headphone according to a wireless communication protocol that includes a selected audio control signal that controls a selected audio function and conforms to a wireless audio control protocol; and
   a converter that converts between the wireless audio control protocol transceived by the wireless transceiver and a local computing device control protocol that controls an audio source device interface on the computing device, the converter further providing to the computing device via the USB port a converted audio control signal that controls the selected audio function and conforms to the local computing device control protocol;

wherein the wireless audio control protocol and the local computing device control protocol both define application-level audio commands, wherein the audio commands comprise: Play, Pause, Volume Up, Volume Down, Forward Track, and Previous Track.

2. The USB dongle of claim 1 in which the computing device does not include a driver for the wireless communication protocol.

3. The USB dongle of claim 1 in which the wireless communications are radio frequency communications.

4. The USB dongle of claim 1 in which the computing device includes a personal computer.

5. The USB dongle of claim 1 in which the local computer device control protocols include an Infrared Data Association (IrDA) standard.

6. A wireless audio headphone communication system, comprising:

an audio input for receiving an audio signal from an audio source;

a wireless transceiver for receiving and transmitting radio frequency communications with a wireless audio headphone, the communications including an audio control signal that conforms to a wireless audio control protocol of a wireless communication protocol; and a converter for converting the audio control signal between the wireless audio control protocol transceived by the wireless transceiver and a local control protocol for controlling the audio source;

wherein the wireless audio control protocol and the local control protocol both define application-level audio commands, wherein the audio commands comprise: Play, Pause, Volume Up, Volume Down, Forward Track, and Previous Track.

7. The wireless audio headphone communication system of claim 6 in which the audio input receives the audio signal as a digital audio signal.

8. The wireless audio headphone communication system of claim 7 in which the audio source is in communication with a USB port and in which the audio input receives the audio signal at the USB port.

9. The wireless audio headphone communication system of claim 7 in which the audio source is included in a personal computer.

10. The wireless audio headphone communication system of claim 6 in which the audio input receives the audio signal as an analog audio signal.

11. The wireless audio headphone communication system of claim 6 further comprising an infrared transceiver for transceiving the audio control signal between the audio source and the wireless audio headphone communication system.

12. The wireless audio headphone communication system of claim 6 in which the audio source does not include a driver for the wireless communication protocol.

13. An audio headphone gateway, comprising:

an audio input for receiving an audio signal from an analog audio source;

a digital converter for converting the analog audio signal to a digital audio signal;

a wireless transceiver for receiving and transmitting radio frequency communications with a wireless audio headphone according to a wireless communication protocol, the communications including the digital audio signal and an audio control signal that conforms to a wireless audio control protocol of the wireless communication protocol;

a converter for converting the audio control signal between the wireless audio control protocol transceived by the wireless transceiver and an infrared control protocol for controlling the analog audio source; and an infrared transceiver for transceiving the audio control signal between the analog audio source and the wireless audio headphone gateway:

wherein the wireless audio control protocol and the infrared control protocol both define application-level audio commands, wherein the audio commands comprise: Play, Pause, Volume Up, Volume Down, Forward Track, and Previous Track.

14. The gateway of claim 13 in which the audio input for receiving an audio signal from an analog audio source is not a wired link.

15. The gateway of claim 13 in which the analog audio source includes a stereo player.

16. A wireless audio headphone communication system, comprising:

a wireless headphone, wherein the headphone is configured to wirelessly receive an audio signal, and wherein the headphone is configured to wirelessly transreceive audio control commands, wherein the audio control commands transreceived by the headphones conform to a wireless audio control protocol; and a dongle communicatively coupled to a computing device and wirelessly coupled to the headphone, wherein the computing device is configured to send the audio signal and wherein the computing device is configured to transreceive audio control commands, wherein audio control commands tranreceived by the computing device conform to a local control protocol, the dongle comprising:

a wireless transceiver configured to transceive wireless communications with the headphone on behalf of the computing device, wherein the wireless communications comprise the audio signal and audio control commands; and a converter that converts between 1) the audio control commands transreceived by the headphones that conform to the wireless audio control protocol and 2) the audio control commands transreceived by the computing device that conform to the local control protocol;

wherein the wireless audio control protocol and the local control protocol both define application-level audio commands, wherein the audio commands comprise: Play, Pause, Volume Up, Volume Down, Forward Track, and Previous Track.

* * * * *

UNITED STATES PATENT AND TRADEMARK OFFICE
CERTIFICATE OF CORRECTION

| | | |
|---|---|---|
| PATENT NO. | : 7,808,962 B2 | Page 1 of 1 |
| APPLICATION NO. | : 12/102812 | |
| DATED | : October 5, 2010 | |
| INVENTOR(S) | : Milan Slamka and Todd Yuzuriha | |

It is certified that error appears in the above-identified patent and that said Letters Patent is hereby corrected as shown below:

Fig. 1, reference 30, "Wireless Transciever" should read "Wireless Transceiver"

Fig. 2, reference 60, "Wireless Transciever" should read "Wireless Transceiver"

Column 6, line 31, "transreceive" should read "transceive"

Column 6, line 33, "transreceived" should read "transceived"

Column 6, line 38-39, "transreceive" should read "transceive"

Column 6, line 40, "tranreceived" should read "transceived"

Column 6, line 49, "transreceived" should read "transceived"

Column 6, line 51, "transreceived" should read "transceived"

Signed and Sealed this
Eighteenth Day of January, 2011

David J. Kappos
*Director of the United States Patent and Trademark Office*